United States Patent Office 3,383,488
Patented May 14, 1968

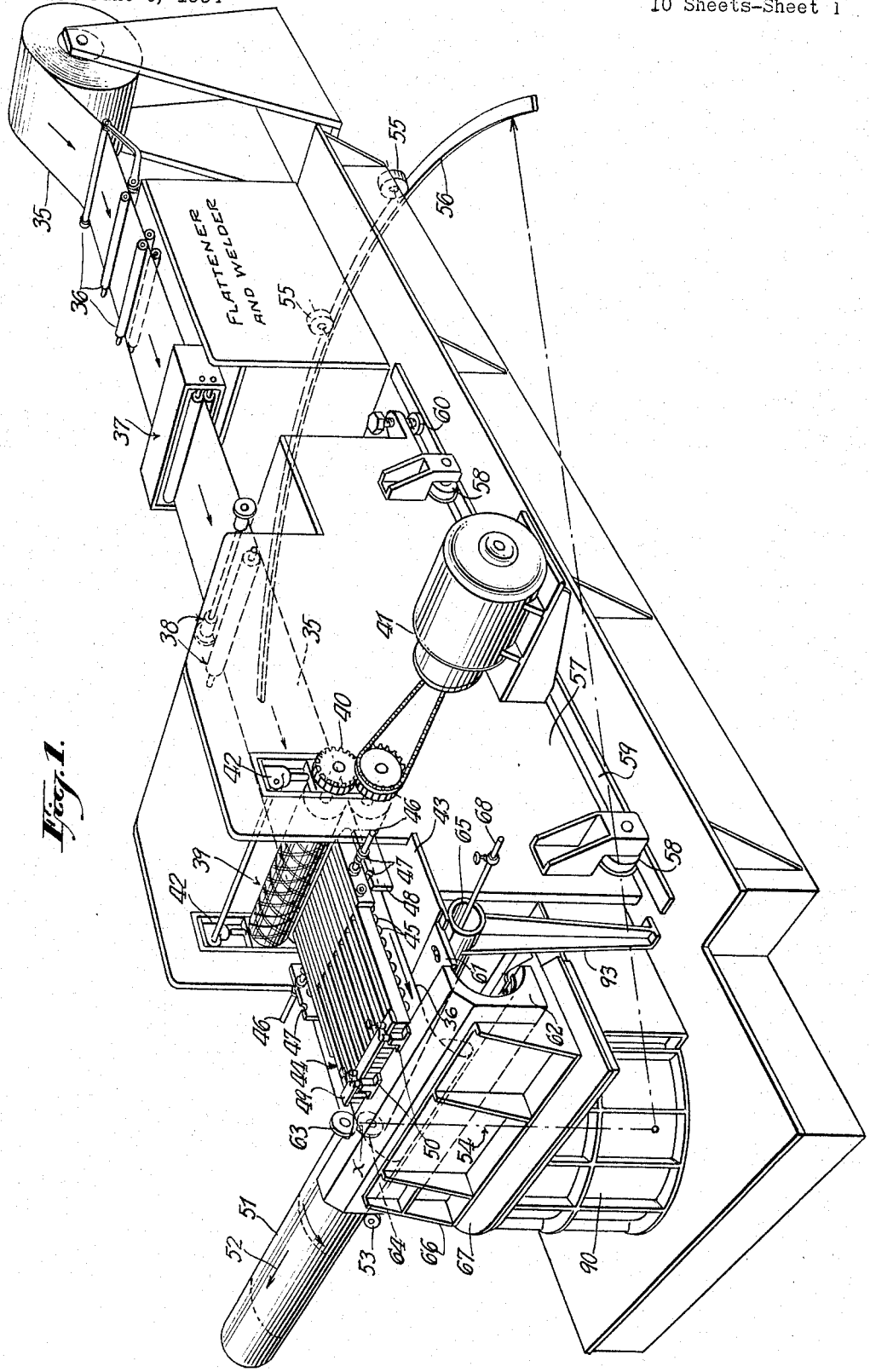

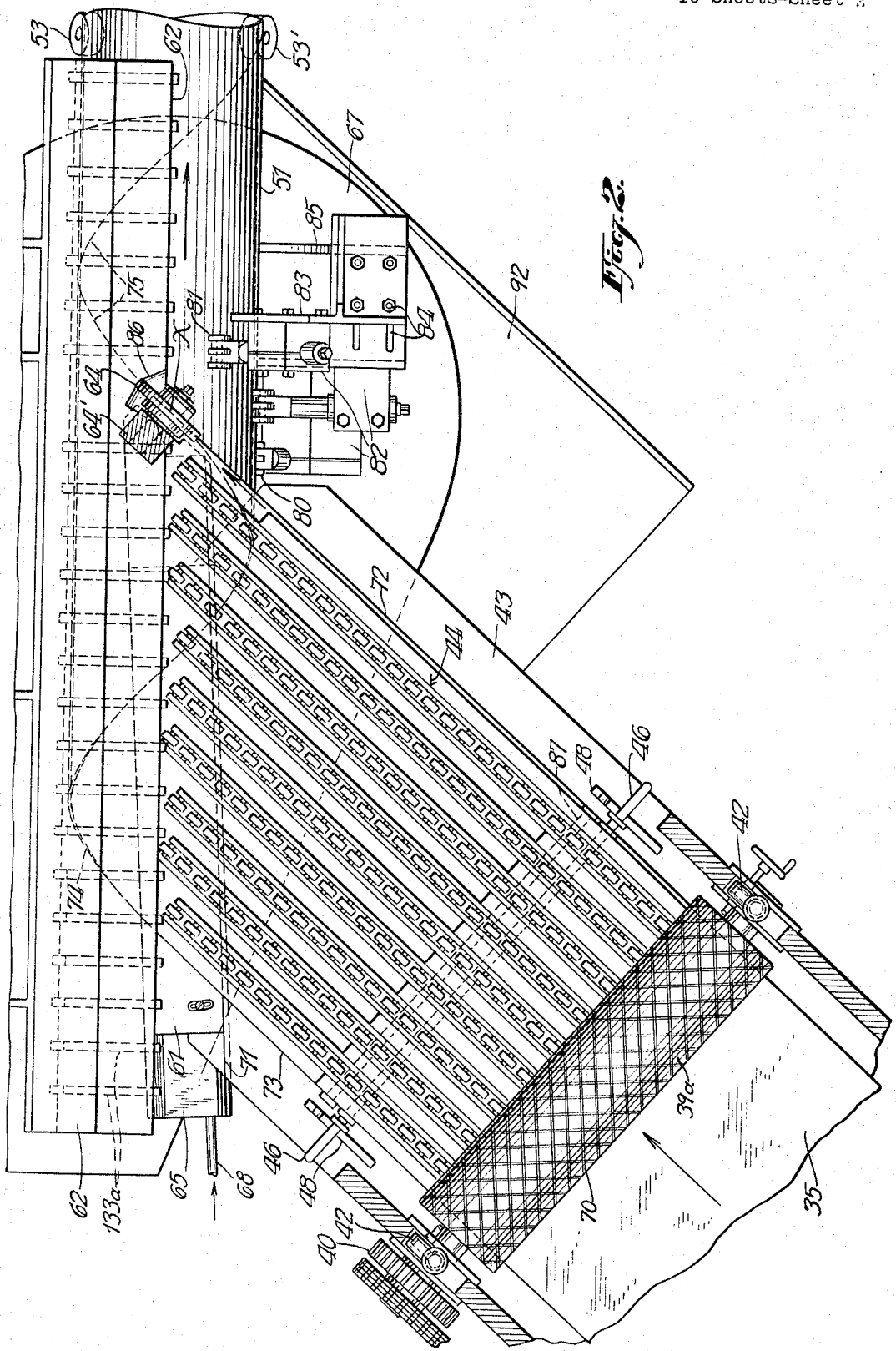

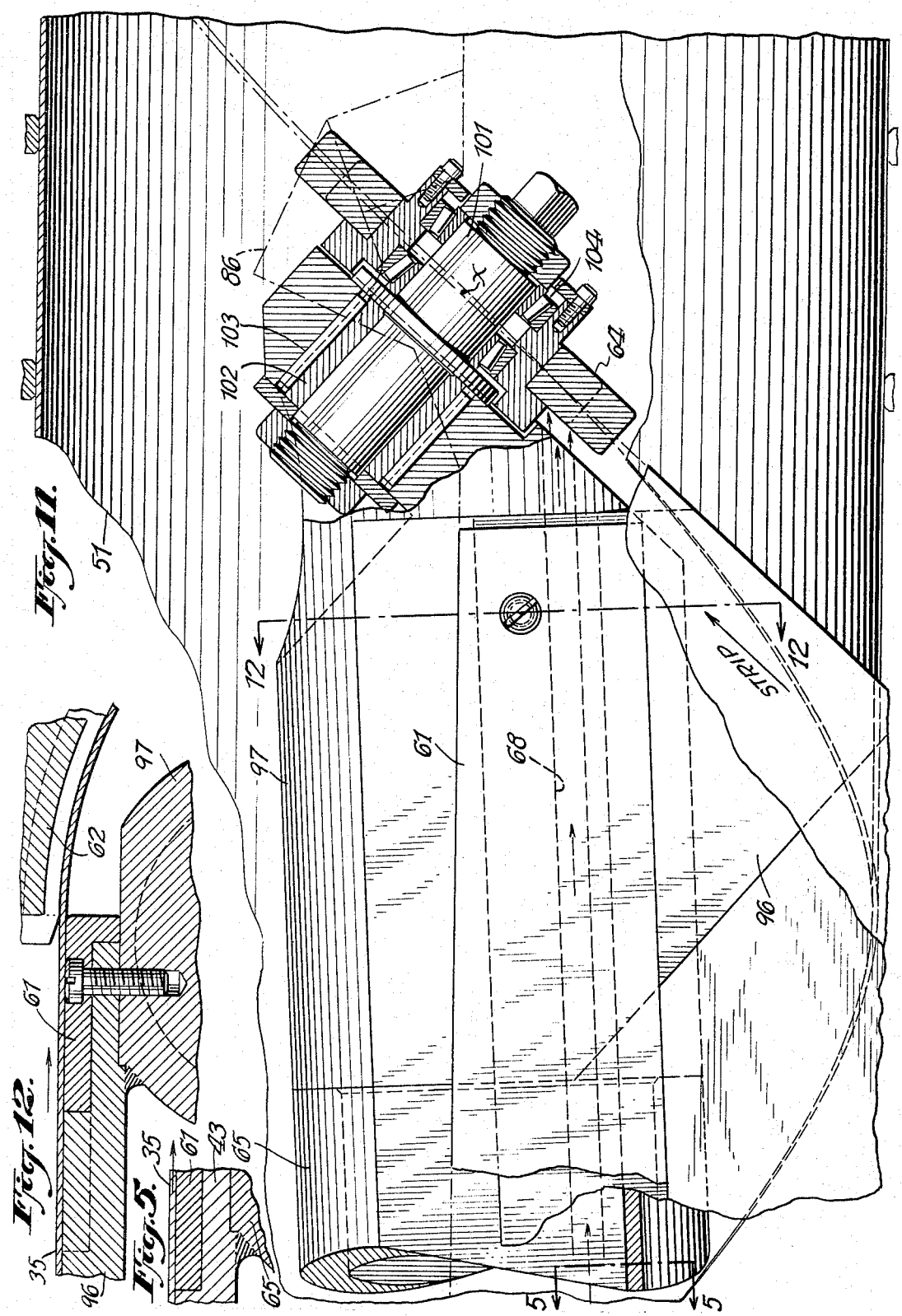

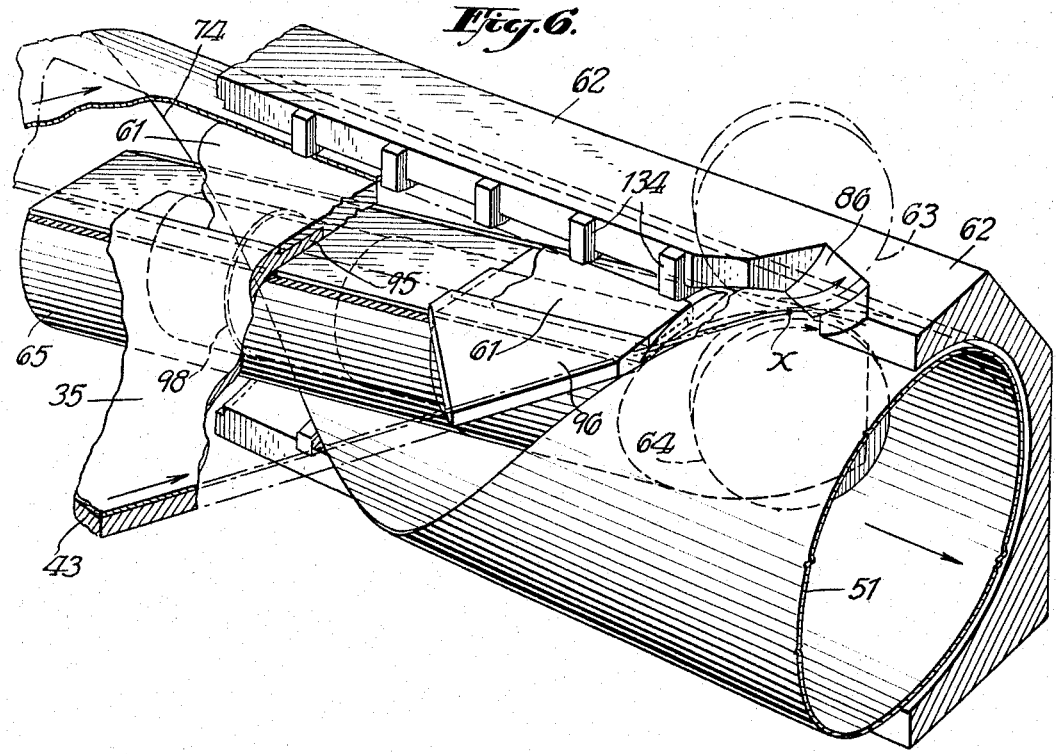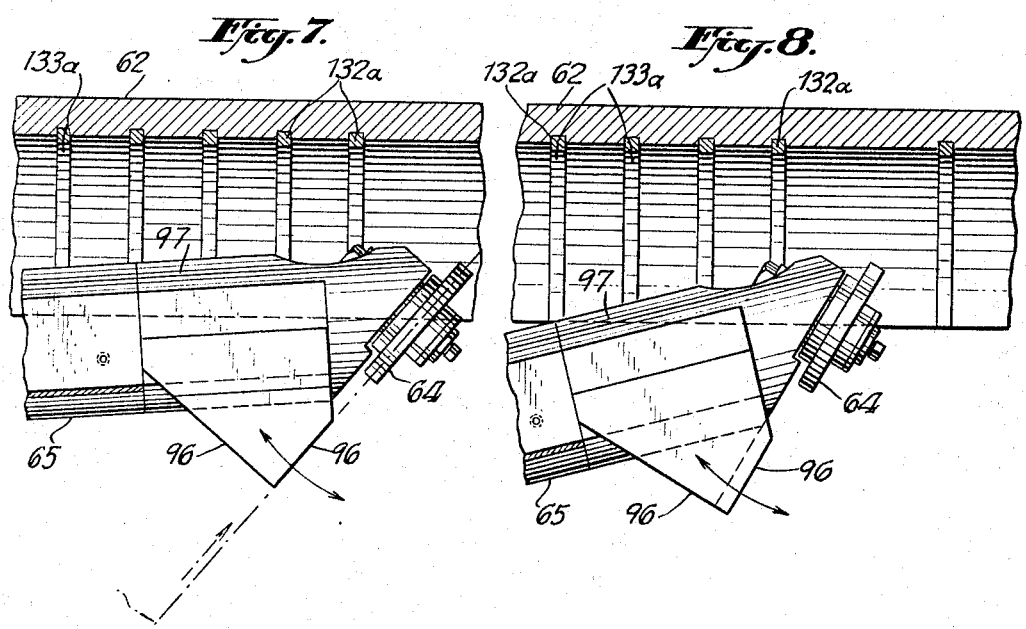

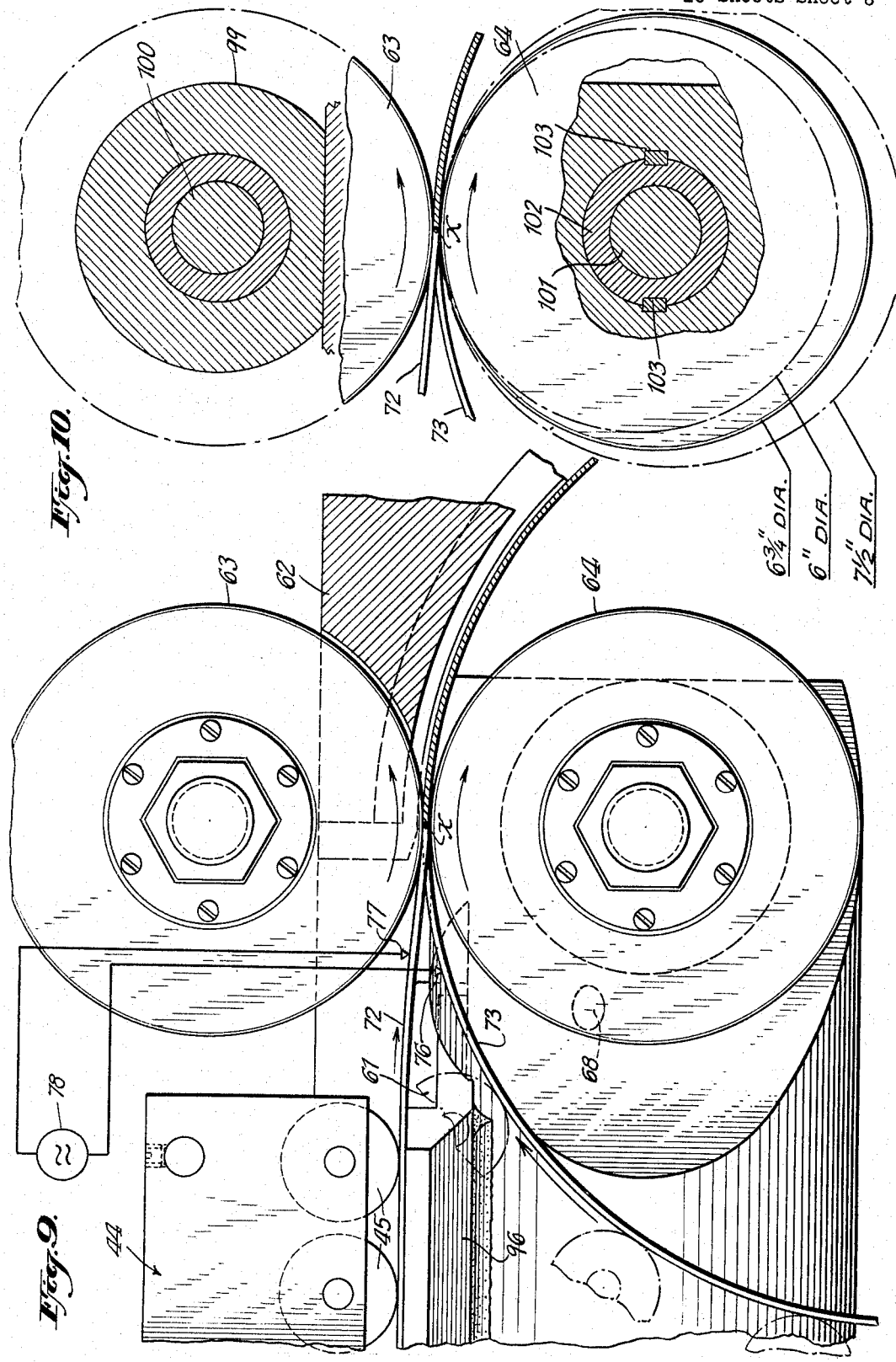

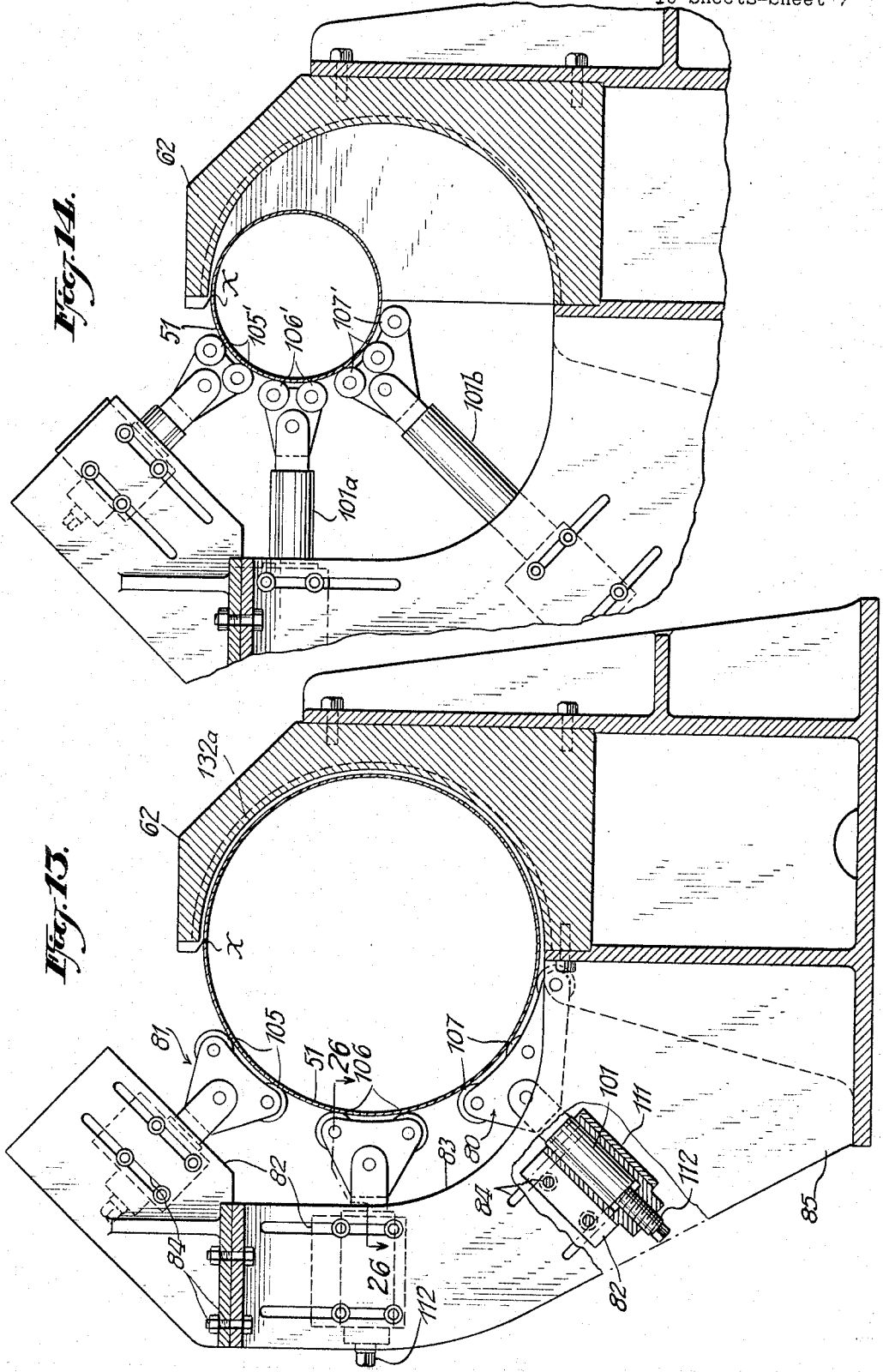

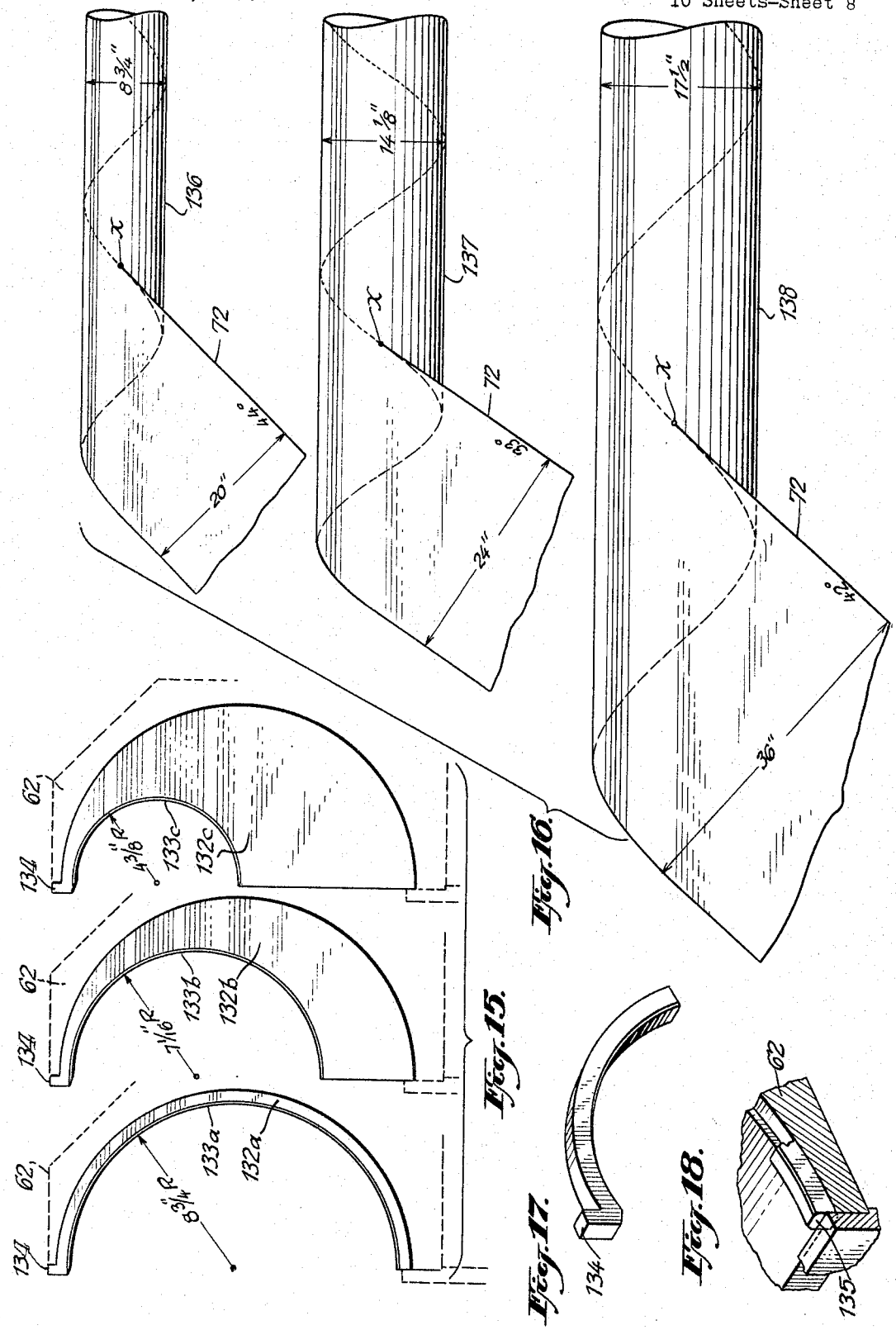

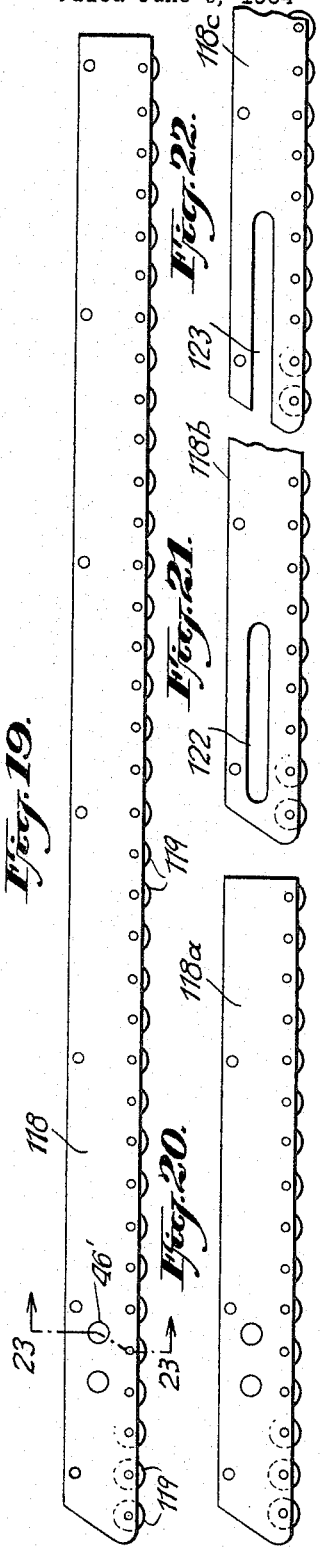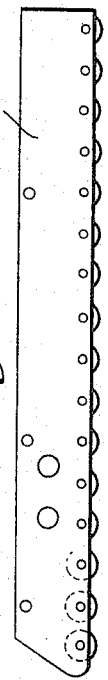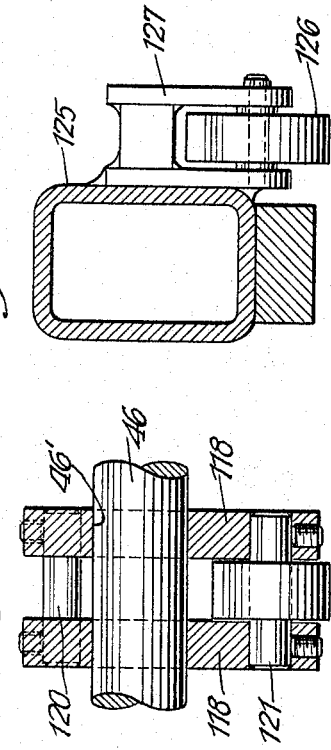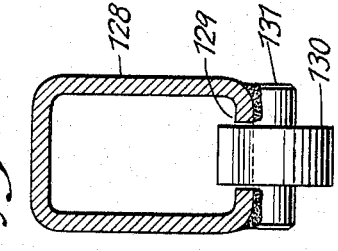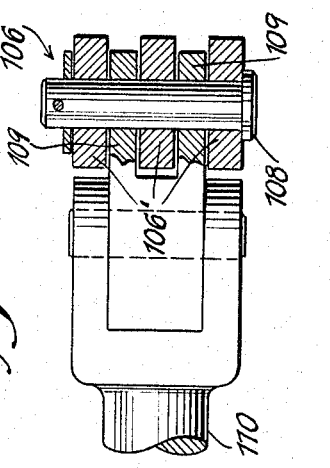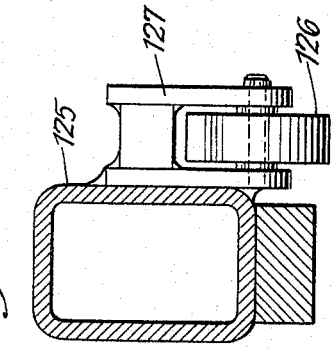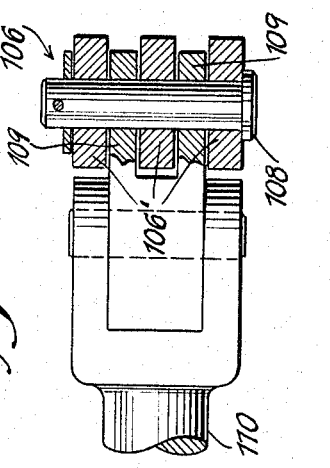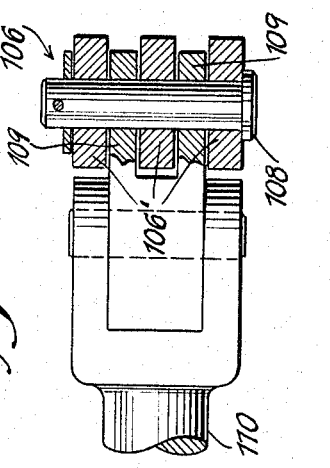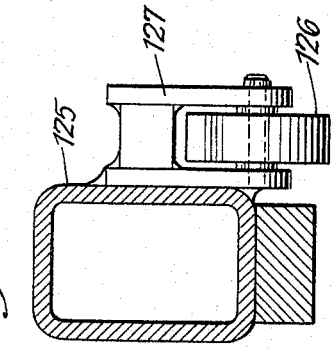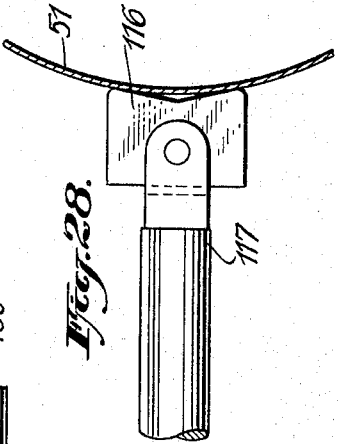

3,383,488
SPIRAL TUBE FORMING AND WELDING
APPARATUS
James Bandura, Haworth, George J. Gendron, Oradell,
Lindsey J. Phares, Butler, and Ira W. Henderson,
Scotch Plains, N.J., assignors to Raymond International
Inc., New York, N.Y., a corporation of New Jersey
Filed June 9, 1964, Ser. No. 373,687
10 Claims. (Cl. 219—62)

ABSTRACT OF THE DISCLOSURE

A spiral tube forming apparatus comprising means for forming a strip of metal against a curved, semi-cylindrical, tube forming surface at a slant angle with respect to the cylindrical axis of the surface. The slant angle and the cylindrical diameter may be changed and means are provided to insure the lateral support of the strip between the means which forces it into the forming surface and the forming surface itself.

---

This invention relates to apparatus for forming metal tubing by winding elongated metal strip material helically into tubular form while welding together the edges of the convolutions being formed, along a helically-extending seam line.

Apparatus for helically winding metal strip material into tubular form has been heretofore proposed, of a type wherein a metal strip is advanced flatwise and more or less tangentially of the position of the surface of the desired tubing, and along a path which extends at an angle to the axis of the desired tubing, substantially equal to the pitch angle of the helical winding being formed, the tubing thus being advanced into a generally semi-cylindrical forming tool within which the strip will be caused to curve around to conform to a cylindrical shape, while being formed into a succession of helically-extending convolutions. One example of this general type of apparatus is disclosed in the U.S. patent to Eckhardt, No. 2,991,740, granted July 11, 1961, and reference to which is hereby made. The present invention more particularly concerns improvements involving alternatives and adaptations of such general type of apparatus.

The present invention provides an improved arrangement of such apparatus which is particularly adapted to be used for welding a helically-extending seam by the use of high frequency heating current applied by contacts respectively to the trailing edge of each convolution and to the leading edge of the next convolution about to be formed, so that the current flows from such contacts along the edges just prior to the weld point where the edges meet, and preferably with the present invention, such edges are brought together in slightly overlapped relation and subjected to sufficient pressure at the heated weld point to flatten them substantially to a single thickness and whereby truly cylindrical and longitudinally straight tubing will be rapidly formed.

Important aspects of the invention include provisions whereby the apparatus may be conveniently adjusted or readjusted from time to time to provide for the manufacture of tubing of various different diameters having helical seams of different pitch angles, and, if desired, formed with different wall thicknesses. To this end among other features, provision is made in the forming tool for the use of readily interchangeable semi-crescent shaped inserts which respectively will appropriately provide for bending of the metal strip or band into convolutions of the desired different diameters and while minimizing friction against the metal being shaped.

To the same end, features for retaining the metal band or strip, as it advances into the apparatus, firmly in flat condition, while still providing for interchangeability or adjustability of the parts, whereby the strip-advancing equipment may be adjusted to comply with various desired pitch angles for tubing of different dimensions without conflicting with the forming tool.

Further aspects of the invention involve arrangements of rollers or anti-friction means for so engaging the formed convolutions as to retain same in proper position as they advance along and out of the forming tool.

Further features of the invention involve improved arrangements for supporting a roller inside the tube as it is being formed for applying the necessary internal pressure at the welding region in opposition to an external roller at that region and all in such manner that the position of such internal roller may be adjusted along with the strip-feeding apparatus to accommodate helically formed tubing having different pitch angles.

In accordance with the invention, the apparatus is also preferably so mounted and arranged that the equipment for feeding the metal strip or band up to the forming tool, may be retracted as a unitary assembly to permit ready access to the forming tool and other parts when adjusting same for making tubes of different dimensions, such unitary assembly also being adjustable arcuately about an axis passing through the weld point, and so that the band or strip will be fed into the forming tool at an angle substantially equal to the desired pitch angle for helically forming tubing of various different dimensions.

Various further and more specific objects, features and advantages of the invention will appear from the description given below, taken in connection with the accompanying drawings, illustrating by way of example a preferred form of the invention.

In the drawings:

FIG. 1 is a perspective view showing a preferred embodiment of the apparatus of the invention;

FIG. 2 is a plan view, with portions shown in section of various of the principal parts of the apparatus;

FIG. 5 is a vertical sectional view, taken substantially along line 5—5 of FIG. 3 and showing certain details;

FIG. 6 is a perspective view partly in section showing further details of various of the parts shown in FIG. 3;

Figure 3:
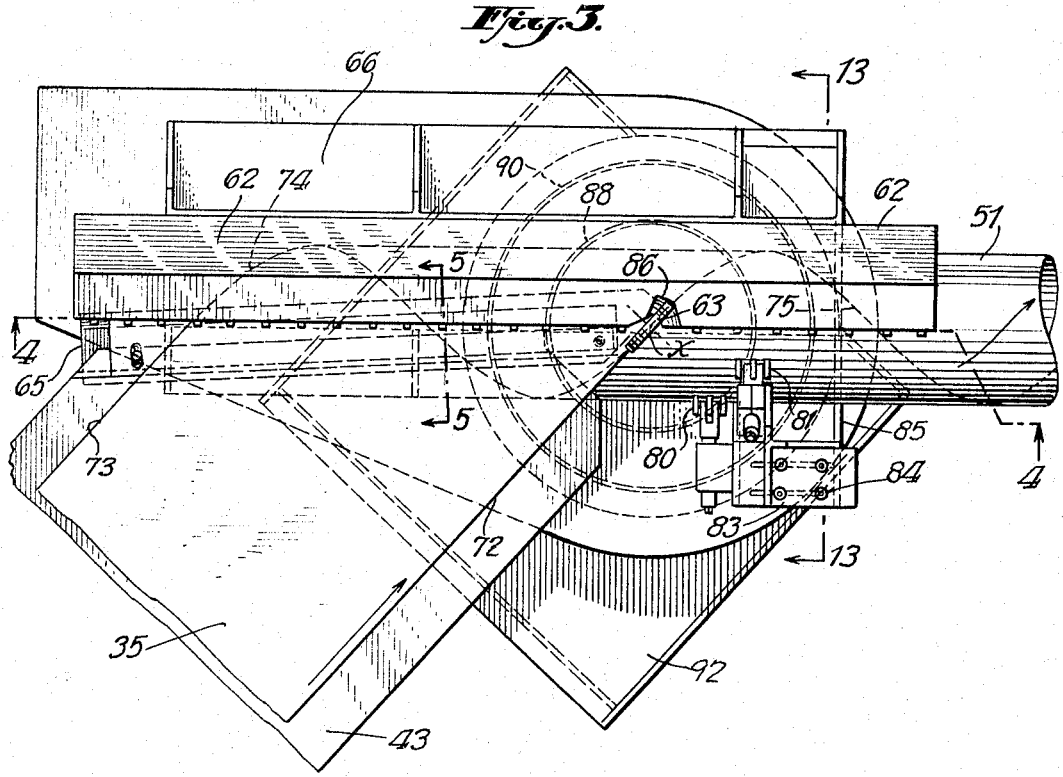
FIG. 3 is an enlarged plan view, also partly in section, further showing various of the parts of the apparatus at the welding region.
Figure 29:
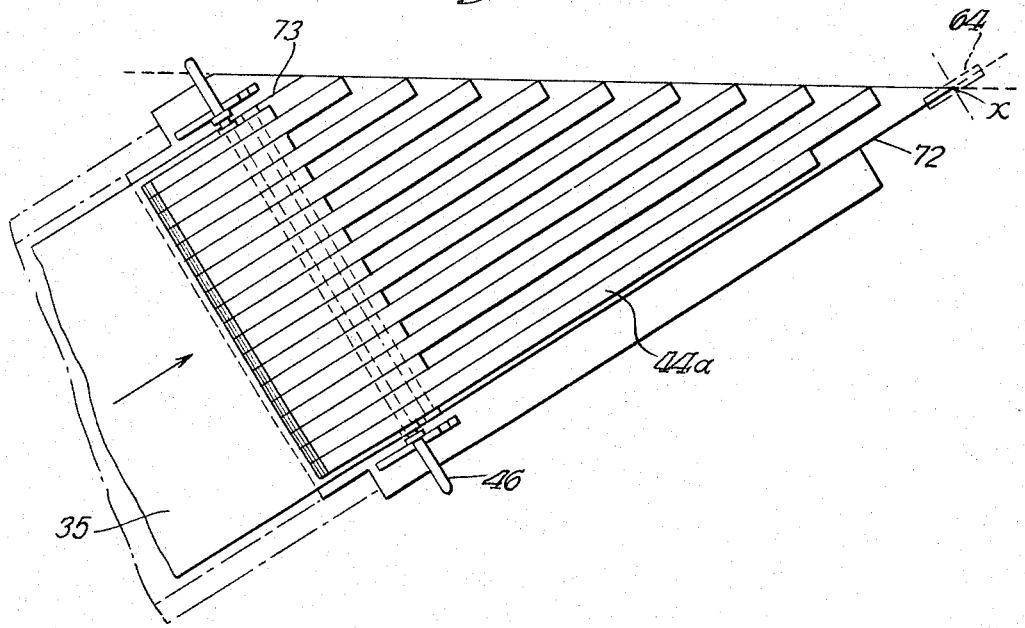
Figure 30:
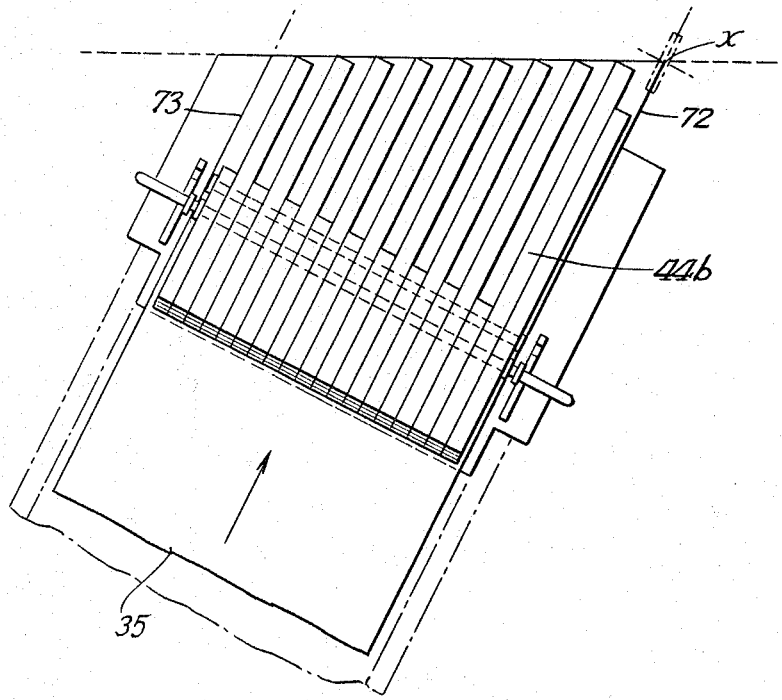

FIGS. 7 and 8 respectively are plan views, partly in section, showing the mounting means and associated parts for the internal pressure-applying roller and when these parts are adjusted at two different angular positions;

FIG. 9 is a vertical sectional view of various parts at the welding region;

FIG. 10 is a vertical sectional view showing further details of the supporting bearing arrangements for the pressure rollers;

FIG. 11 is a horizontal sectional view of the bearing and mounting means for the internal pressure roller and adjacent parts;

FIG. 12 is a vertical sectional view, taken substantially along line 12—12 of FIG. 11;

FIG. 13 is a vertical sectional view, taken substantially along line 13—13 of FIG. 3, showing various supporting rollers in positions adjusted to accommodate relatively large diameter tubing; whereas FIG. 14 is a similar view with these rollers shown as adjusted to positions for accommodating smaller sized tubing;

FIG. 15 shows elevational views of three alternative forms of semi-crescent shaped elements adapted to be interchangeably inserted in the forming tool to provide for tubing of different sizes;

In FIG. 16, tube formations of three different sizes with the helical seam lines thereon are shown, these tubes respectively being formed when using inserts as of FIG. 15;

FIG. 17 is a perspective view of the upper portion of one of said inserts;

FIG. 18 is a perspective view, partly in section, showing the manner in which the lower portion of one of said inserts engages the forming tool;

FIGS. 19, 20, 21 and 22 respectively show bar members of three different lengths with rollers at the lower edges thereof for engaging the metal strip or band to retain same flat prior to its entering the forming tool;

FIG. 23 is a sectional view taken substantially along line 23—23 of FIG. 19;

FIGS. 24 and 25 are similar sectional views, but showing alternative possible forms of these parts of the construction;

FIG. 26 is an enlarged detail view, partly in section, of certain of the roller means shown in FIG. 13, FIG. 26 being taken substantially along line 26—26 of FIG. 13;

FIGS. 27 and 28 show substitute embodiments for the means shown in FIG. 26;

FIG. 29 is a plan view showing an assembly of the bar members, such as of FIGS. 19–22, as assembled in operative positions; and FIG. 30 is a view similar to FIG. 29, but showing an alternative assembly of the bar members, arranged to provide for tubing with a helix angle different from that provided when the arrangement of FIG. 29 is used.

The general arrangement of the apparatus will first be explained in connection with FIG. 1 wherein a coil of strip or band-like weldable material is indicated at 35, from which the strip may be drawn past various guide rollers, or rollers for flattening same, as indicated at 36, over suitable equipment, generally indicated at 37, at which provision may be made for welding the trailing end of one piece of strip to the forward end of another, such equipment, however, forming no part of the present invention. The strip may then be drawn past suitable edge and surface guide roller means, as at 38, to a feed roller assembly at 39 which may be driven through gearing 40, by a drive motor 41. The bearing blocks for the upper one of these rollers may be accompanied by suitable gear means at 42, for adjusting the pressure which such roller applies to the upper surface of the advancing strip 35. These rollers serve to slidably push the strip forwardly over a supporting table means 43 and along beneath an assembly of longitudinally-extending bar-like members 44, the lower edges of which carry successions of numerous small rollers 45 for anti-friction engagement with the upper surface of the advancing strip for holding same at all areas thereof firmly flatwise down against the surface of table 43, thus to prevent humping or wrinkling of the strip as same is pushed forward. The bars 44 and the assembly thereof will be described in further detail below in connection with FIGS. 19–25 and FIGS. 29–30. The rear portions of the bar assembly are suitably secured together and carried on a through-rod 46, the ends of which may rest alternatively in several notches, as at 47, in supports 48, so that the bar assembly may be adjustably moved forwardly during operation, or the bar assembly may be moved to the rearward position, which is on a higher plane, to hold the bars up off the table when adjustments have to be made to the mechanism or the unit is to be cleaned. The forward ends of the bars may be held down against the advancing strip as by a cross bar 49 held in place by suitable clamping means 50.

The helically formed and welded tubing is shown at 51 emerging from the welding region of the apparatus in the direction of the arrow 52. Such formed tubing may be supported by suitable supporting and conveying means comprised of suitable rollers arranged as desired, and one of which is indicated at 53. The tubing 51 advances from the apparatus with its axis extending along a line at an angle to the incoming strip 35, such angle being substantially equal to the pitch or helix angle of the helical seam line on the welded tubing. And such angle may be suitably adjusted, when tubes of different dimensions are being made, by arcuately moving the whole assembly of the strip-advancing apparatus above described about a vertical axis 54, which, as further hereinafter explained, passes vertically approximately through the weld point, that is, the point where the forward edge of the advancing strip becomes welded to a trailing edge of the previously formed convolution of the strip. In order to adjust the strip-advancing equipment angularly about the axis 54, the rear portions thereof may be swung so that a series of supporting rollers, as at 55, will roll along an arcuate track 56, and when the equipment has been moved to its desired angular position, the roll of strip material 35 may be moved into position for feeding the strip therefrom through the equipment.

The strip-advancing equipment, including the feed rollers 39, drive motor 41, table 43 and the frame parts 57 therefor, together with various other parts hereinafter referred to, may also be retracted as an assembled unit back away from the axis of the formed tubing, in order to give ready access to the numerous parts at the region where the tubing is formed and welded, to permit adjustments, repair and substitution of parts to provide for the making of tubing of various different dimensions.

To accomplish this, the frame assembly 57 may be carried on rollers, as at 58, located at each side of such frame, and which may roll along track means as at 59. When this assembly has been rolled forward into operative position, same may there be held against further moving on the track 59, as by suitable clamp or stop means, such as indicated at 60.

With the above-described arrangement, the apparatus may be adjusted to accommodate the manufacture of helically formed tubing of various dimensions, having different helix angles, all by adjusting the angular position of the strip-advancing assembly while leaving the direction of advance of the tubing fixed. This will permit the use of suitable extensive conveying means which may be mounted in fixed position, as also may be suitable equipment for cutting the formed tubing into desired lengths, without going to the trouble of changing the position of such conveying and cutting equipment when the apparatus is adjusted for making tubing of different dimensions.

The strip, after advancing over the surface of the table 43, may further be slidably advanced over a wedge-shaped member 61. This member is secured to the forward edge of the table 43 in a manner so as to be readily replaceable by other like wedge-shaped members, except having different wedge angles depending upon the helix angle at which the strip is being advanced for making tubing of different dimensions. From the forward edge of the wedge member 61, the strip 35 advances into a forming tool 62 (described in further detail hereinafter) and which has a generally semi-cylindrical cavity extending lengthwise of the axis of the formed tubing and in which cavity surfaces are provided for causing the advancing strip 35 to be curved down and around to form same into continuous successions of convolutions, so that the trailing edge of one convolution meets a forward edge of the incoming strip at substantially the weld point, the edges preferably being somewhat overlapped, same being heated to welding temperature by means such as referred to hereinafter, and being firmly pressed together at the region of the weld point by an upper pressure roller 63 and a lower pressure roller 64, the latter being located internally of the tubing. The roller 63 may be mounted on any suitable desired bearing means, adjustable so that same will rotate in a vertical plane extending along the edge of the approaching strip 35, and suitable known means may be provided for strongly pressing this roller 63 downwardly against the region of the weld point. The lower or inner pressure roller 64 may be carried on supporting means hereinafter further described, and including a mandrel-like member 65. This member is suitably mounted with respect to the forward end of the supporting table 43. The forming tool 62, on the other hand, is permanently mounted in a bracket or frame means 66, carried by a supporting table 67, so that the axis of this forming tool is fixed and extends along the direction of advance of the formed tubing 51. That is, the forming tool and its supports are not arcuately movable or adjustable along with the assembled arrangement which advances the strip to the forming tool.

A pipe is indicated at 68 for conveying cooling fluid through the mandrel means 65 and for discharging same to cool various of the parts at the weld region. Other cooling fluid pipes or nozzles may also be provided, as may be required to cool the parts at the welding region.

Reference will now be made to FIG. 2 showing in further detail various of the parts. The strip 35 is here shown as being advanced under the upper feed roller 39a, the surface of which may be formed with numerous oppositely-directed spiral grooves 70, in which any excess lubricating liquid may gather to flow outward endwise of the roller so that same will not unduly interfere with firm frictional engagement of the roller with the strip, as required for uniformly and forcefully advancing the strip.

The supporting table 43 for the advancing strip appears in plan view in FIG. 2, and the above-mentioned wedge means 61 appears extending along the forward edge 71 of the supporting table and just above the mandrel-like means 65. The right hand edge 72 of the strip 35 is shown in FIG. 2 as passing directly to the weld point $x$ located at the upper surface of the inner or lower pressure roller 64, the latter being mounted (as hereinafter described) on the right hand end of the mandrel-like means 65. The left hand edge of the strip 35, as shown at 73 in FIG. 2, advances into the forming tool and becomes curved along the dash line indicated at 74 inwardly and downwardly and thence outwardly of the lower portion of the forming tool, and upwardly and around to the weld point $x$, where it meets and becomes welded to the edge 72, so that the welded seam then proceeds helically about the formed tubing 51 and along the dash line indicated at 75.

It will be noted in FIG. 2 that the convolutions of the tubing become completely formed at the region of the weld point, but just shortly in advance of such weld point, means are provided for heating the edges of the gap located in advance of such point so as to heat the edges to suitable welding temperature upon their reaching that point, and a temperature such that the pressure rollers 63 and 64 are able to mash the metal down to substantially a single thickness thereof, in case, as preferred, the edges are brought together in slightly overlapped relation. Preferably such heating means, as schematically indicated in FIG. 9, may, according to a known arrangement, comprise contacts, as indicated by the arrows 76 and 77 engaging the edges 72 and 73 respectively at points shortly in advance of the weld point $x$, these contacts being connected to a source of high frequency current 78, so that such current will flow from the contacts along the edges of the gap between edges 72 and 73, to and from the weld point $x$. The current may, for example, be of a frequency of the order of several hundred thousand cycles, so that, by reason of mutual inductance, with the current flowing along on opposite sides of the gap in opposite directions at any one moment, the current and the consequent heating effect, will be closely concentrated along the gap edges, as has been heretofore known with such methods of high frequency welding.

As further shown in FIG. 2, at the region below the weld point $x$, a portion of a formed convolution is advancing upwardly and forwardly to the weld point and it is important that this portion be firmly kept urged under pressure toward the weld point and in a direction inwardly of the forming tool 62. For this purpose, groups of rollers as at 80 and 81 are provided, mounted on suitable supporting structure 82, the details of these assemblies being further described below in connection with FIGS. 13, 14 and 26–28. The structure 82 may be carried on supporting means 83, being secured by adjustable bolt and slot means 84 to a portion 85 mounted on stationary table means 67, on which also the forming tool 62 is fixedly supported.

In FIG. 2, the lower or inner pressure roller appears at 64, and the supporting bearing for the upper pressure roller is shown in section at 64'. The forming tool 62 at this region is formed with angularly-shaped notched cut-out 86 to afford clearance space for the pressure roller.

The assembly of bars 44 each carrying a multiplicity of small rollers for engaging the upper surface of the advancing strip, is shown in further detail in plan view in FIG. 2, and the construction thereof will be further described below in connection with FIGS. 19–26. It will be noted that in the preferred form, these bars are arranged in pairs, each pair carrying a series of the small rollers. Also it will be noted that each pair extends from adjacent the feed roller 39a forwardly for the various distances required, so that they will extend respectively to points where the advancing strip is about to enter the forming tool 62. In FIG. 2, the through-rod 46 for carrying the series of bars, is shown in further detail, as are also the blocks or supports 48 along which the assembly may be moved forward for operation, or rearward and upward to hold the bars up off the table when adjustments have been made to the mechanism or the unit is to be cleaned. The assembly may be interconnected by a transverse rod 87 with threaded nuts at its ends for clamping the assembly together.

In FIG. 3, various of the parts at the welding region are shown enlarged and in further detail than in FIGS. 1 and 2, and the parts are here identified by the same reference characters.

Figure 4:
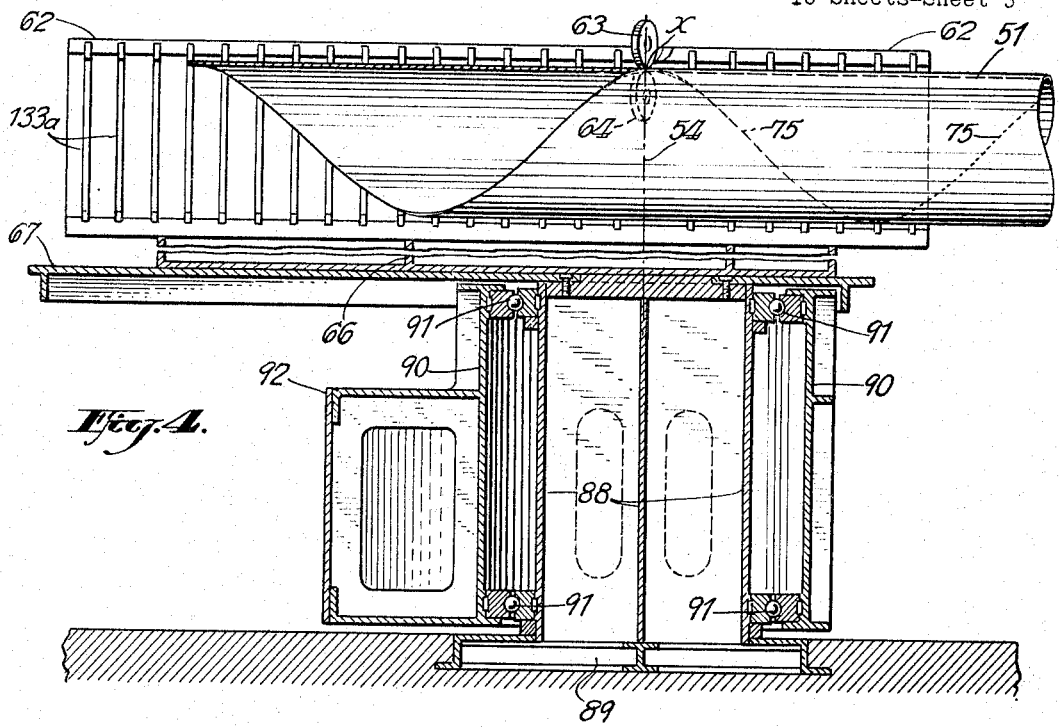
FIG. 4 is a vertical sectional view, partly broken away, taken substantially along line 4—4 of FIG. 3.

In FIG. 4, which is a vertical sectional view partially broken away, taken substantially along line 4—4 of FIG. 3, it will be noted how the bracket means 66 for the forming tool 62 is supported on the stationary table means 67, the latter in turn being suitably affixed to a central cylindrical post-like structure, shown in section at 88, mounted on a fixed base 89 and surrounded by a relatively arcuately movable cylindrical supporting structure 90, also shown in section, and which is rotatable about the axis 54 on suitable annular bearing means 91, surrounding the post structure 88. The cylindrical supporting structure 90 is suitably connected to and forms a part of the frame structure 57 (FIG. 1) on which the strip-advancing equipment is mounted, and so as to be able arcuately to move, as above explained in connection with FIG. 1. The structure 90 has an extension 92 for supporting various of the parts.

The mandrel-like means 65 for carrying the lower or inner pressure roller 64, may be supported at its outer end by suitable bracket means (as indicated at 93 in FIG. 1) and same may also be suitably attached along the forward edge of the table-supporting structure, as shown in FIG. 5. It will be noted that this mandrel-like means is not located coaxially with the forming tool or shoe 62, but instead is suitably supported so that the lower pressure roller 64, as mounted on this mandrel means, may be adjusted to rotate in the plane in which the welded seam line is located at the welding region. The relationship of the mandrel-like means 65 with respect to the shoe 62 depends upon the angle at which the machine is set, there being one angle at which it would be coaxial.

The construction and relationship of the mandrel-like means 65 and adjacent parts, will now be further described in connection with FIGS. 6–8, wherein also various of the parts above mentioned are identified by the same reference numerals. In FIG. 6 the position of the supporting table 43 for the advancing strip 35 is shown, and portions of the wedge means 61 at the forward edge of the table are shown partially in section, and having one edge overlapping and removably secured along in a recess (as indicated at 95) at the forward edge of the table and along above the mandrel-like means 65. The inner end portion of the wedge 61, instead of being connected to the forward edge of the table 43, may be connected to a pointed horn-like portion 96, which in turn is suitably fixedly mounted on the inner end of the mandrel-like means 65. The inner end portion 97 of the mandrel-like means 65 on which the portion 96 is affixed, preferably is separable from the remainder of the mandrel means, so that same, together with the roller 64 and its bearing, may be removed as a separable unitary assembly for repair, replacement or readjustment of parts. That is, the mandrel portion 97 may be secured to a suitably-shaped support (as shown by the dotted lines 98 in FIG. 6) which is slidably received in the hollow end of the mandrel-like means 65.

FIGS. 7 and 8 show two possible angular positions of adjustment of the mandrel and mandrel portions 65 and 97, and roller 64 and the portion 96, occurring when same are positioned to correspond to two different angular positions of adjustment of the strip-feeding equipment, so that the roller 64 will rotate along the plane of the desired seam line in each case. Reference will now be had further to FIG. 9 showing further details at the welding region, in sectional elevation. Here an end view of the wedge means appears at 61, and end views and parts of side views of the horn-like structure, appear at 96.

In the vertical, sectional view of FIG. 10, the bearing means for the upper pressure rollers 63 is shown in section at 99, and the shaft therefor at 100. In the same view, the strip edges 72 and 73 are shown coming together at the weld region x at the nip of the pressure rollers 63 and 64. The roller 64 may be mounted on a shaft 101 carrying a collar 102 fixed against rotation as by splines 103 within the bearing support. The collar 102 is designed to be interchangeable with other collar means having various degrees of eccentricity so that the effective position of the axis of rotation of the roller 64 may be adjusted up and down to allow for adjustment when rollers are used that have been dressed (turned down). The roller is always mounted so that it is tangent to the top plane of the table. The arrangement of this bearing is further shown in horizontal section in FIG. 11, including the replaceable eccentric bushing or collar 102 surrounding the shaft 101 on which an annular roller bearing 104 is provided for carrying the roller 64.

Reference will now be had to FIG. 13 showing a typical set of rollers (such as referred to at 81 in FIG. 2) for properly positioning the formed tube convolution by engaging same just in advance of the weld point and for holding same in proper position in the forming tool 62. That is, as shown in FIG. 13, in a typical case, three pairs of groups of rollers, as at 105, 106 and 107, are positioned to engage the tubing in the proper arcuate arrangement, at the proper position to contain the tube within the confines of the shoe and the rollers themselves. Each group of these rollers may (as shown in FIG. 26) comprise three rollers as at 106', carried on a shaft 108, which in turn is supported by a suitable yoke means 109, carried by a plunger 110. The plungers such as at 110 (as shown in FIG. 13) may be slidably adjustable in cylinders 111, having at their ends setscrews as at 112 for adjusting the amount by which the plungers protrude from the cylinders and consequently fixing the positions of the rollers radially with respect to the convolution of tubing to comply with the diameter of the particular tubing being formed.

When the tubing being formed is of a substantially smaller diameter (as shown in FIG. 14) some of the roller-carrying plungers, as at 101a and 101b, may be made longer so as to bring the rollers, as at 105', 106' and 107', into proper positions to accommodate such smaller tubing.

In some cases, particularly with smaller tubing, only a single roller may be necessary at each point, such as indicated at 113 in FIG. 27, same being carried on a plunger 114. Alternatively, in some cases, in lieu of using rollers, a laminated plastic shoe means, as at 116 in FIG. 28, may be used as the anti-friction means engaging the tubing 51, same being pivotally carried on a plunger as at 117.

The parts of the bar assembly 44 referred to in connection with FIGS. 1 and 2, will now be described in further detail in connection with FIGS. 19-25 inclusive. One of the longer bars is shown at 118 having a multiplicity of rollers, as at 119, pivotally mounted along its lower edge, and, as shown in FIG. 23, the rod 46 passes through apertures as at 46' in bars 118. As further shown in FIG. 23, the bars are preferably arranged in pairs fixed together at various points as by small shafts 120, secured in the bars as by setscrews, as shown. The small rollers 119 may be rotatably carried on short shafts, as at 121, affixed as by setscrews in the lower edges of the bars.

Similar but shorter bars are shown at 118a, 118b and 118c for making up the assembly shown at 44 in FIG. 2. If desired, some of the shorter bars 118b and 118c may be formed with slots as at 122 and 123, instead of round holes, for receiving the shaft 46 to permit these bars to be longitudinally slidable, if desired, with respect to the remainder of the assembly, and so as properly to adjust the positions of the forward ends thereof.

FIG. 24 shows in vertical cross-section an alternative form of bar 125, formed for example of a length of tubing of substantially square cross-section and with the small rollers, as at 126, mounted along the side thereof on bracket means as at 127. Still another alternative is shown in FIG. 5, where a similar bar of tubular cross-section is shown at 128, and along the under side of which apertures are formed as at 129 for receiving portions of the small rollers, as at 130, which may be carried on shafts 131 welded to the edges at the bottom of the tube 128.

FIGS. 29 and 30 show two different typical patterns or arrangements of these bar assemblies for corresponding to two different angular adjustments of the strip-advancing apparatus. The bars nearest the strip edge 72 in FIG. 29 will be progressively considerably longer than those nearest the strip edge 73. In FIG. 30, it will be noted that the bars do not differ in length as markedly as do those of FIG. 29. As the strip 35 is being pushed forwardly into the forming tool under considerable endwise pressure, it is highly important that same be retained in uniform flat condition, free of bulging and of vibrations, in order that the forming tool will shape the strip into the desired accurate and uniform cylindrical shape. The provision of this assembly of bars carrying the multiplicity of small rollers, insures that all of the numerous small areas engaged by the rollers on the strip will be firmly held flat against the supporting table, while friction against slidable movement of the strip is minimized by the rollers. Furthermore, the provision of this flattening means in the form of numerous interchangeable and replaceable bars of various lengths, provides a convenient means by which the overall pattern of this flattening means may be varied in shape, depending upon the particular angle at which the strip is to be fed into the forming tool, each bar being readily and quickly replaceable, as required, by longer or shorter bars, such as per the patterns shown in FIGS. 29 and 30.

As above mentioned, the forming tool or shoe 62 is to be provided with interchangeable semi-crescent shaped inserts to provide respectively for the making of tubing of different diameters. Three typical inserts of this nature are shown in FIGS. 15 at 132a, 132b and 132c. The peripheries of these inserts are semi-circular and adapted to be received in correspondingly-shaped semi-annular slots on the interior surface of the forming tool 62. The interior edges of each of these inserts, as at 133a, 133b and 133c are also semi-circular and each has a radius corresponding to the radius of the external surface of the tubing to be formed.

As shown by dotted lines in FIG. 2, for example, these inserts may be arranged at spaced positions throughout the length of the forming tool 62, except that one of same may be omitted at the welding region. In the example shown, there are some twenty-three of these inserts which are sufficient to meet the requirements in typical cases.

As further shown in FIGS. 15 and 17, the upper ends of these inserts may be formed with upwardly protruding retaining lugs, as at 134, engaging the upper edge of the forming tool 62, and as shown in FIG. 8, the lower edges of each insert may have a formation, indicated at 135, for engaging at the lower edge of the forming tool 62.

In FIG. 16, three different formed tubes are shown at 136, 137, 138, with the external tube diameters thereon indicated, as well as the widths of the advancing strip appropriate for the three inserts respectively of FIG. 15, having the internal radii indicated in the latter figure. In FIG. 16 also, the angles are indicated at which the strip edges 72 are positioned with respect to the axis of the tubing when approaching the weld points x in each case.

The use of these inserts, as above described, greatly facilitates adjusting the equipment for making tubing of different dimensions, without the necessity of removing and replacing the heavy forming tool or shoe 62, thereby also avoiding the necessity of providing a variety of sizes of such large forming tools to accommodate tubing of different dimensions. These inserts have even more significant advantages, in that they provide for easy and relatively inexpensive replacement of the surfaces thereof which tend to be worn, without the necessity of replacing the whole forming tool and furthermore, since the metal strip 35 engages only the relatively narrow edges of the inserts, frictional resistance is minimized without detracting from the efficiency of the forming tool in properly and uniformly shaping the tubing.

Although a particular embodiment of the invention with certain variations is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for helically winding weldable strip material to form tubing and for welding the trailing edge portions of each convolution to the leading edge of the next to form a helical seam, said apparatus comprising in combination: an assembly of devices for forcefully advancing the strip longitudinally in a predetermined direction at an angle to the axis of the desired tubing substantially equal to the pitch angle of the desired seam; a forming tool having interior surface portions conforming to a generally semi-cylindrical surface coaxial with the axis of the tubing being formed; means for supporting said tool in a position to extend longitudinally of the axis of the formed tubing, said assembly acting to push and guide said strip against portions within said forming tool, and thence circumferentially of said surface portions to form and advance the convolutions in a direction along the axis thereof, and whereby the trailing edge on the formed convolutions meets the incoming forward edge of the strip at a fixed weld point, said forming tool being provided interiorly with a plurality of spaced-apart inserts, each positioned in planes generally transverse to the forming tool and presenting inwardly-directed, generally semi-cylindrical edges which collectively form said surface portions which engage the strip and shape said convolutions, said inserts being readily replaceable by others having semi-cylindrical edge surfaces of different radii for forming tubing of different diameters; and means for heating said edges to welding temperature upon reaching said point.

2. Apparatus for helically winding weldable strip material to form tubing and for welding the trailing edge portions of each convolution to the leading edge of the next to form a helical seam, said apparatus comprising in combination: an assembly of devices for forcefully advancing the strip longitudinally in a predetermined direction at an angle to the axis of the desired tubing substantially equal to the pitch angle of the desired seam; a forming tool having interior surface portions conforming to a generally semi-cylindrical surface coaxial with the axis of the tube being formed, said assembly being arranged and positioned for acting to push and guide said strip against upper surface portions within said forming tool, and thence around circumferentially on said surface portions to form and advance the convolutions in a direction along the axis thereof, and whereby the trailing edge of the formed convolutions meets the incoming forward edge of the strip at a fixed weld point at the upper side of said forming tool; means for heating said edges to welding temperature upon reaching said point; and means mounted in a position to engage the exterior surfaces of the formed convolutions at an area shortly prior to their arrival at the weld point for containing the formed convolutions within the confines of the forming tool and said means and for holding said trailing edge in predetermined relation to said leading edge at said weld point, said means including at least one element thereon having anti-friction engagement with said exterior surfaces of the convolutions.

3. Apparatus in accordance with the foregoing claim 2 and in which the anti-friction means comprises a roller or rollers mounted on means for adjusting the position of same in directions radially of the axis of the tubing being formed to accommodate tubing of different diameters.

4. Apparatus in accordance with the foregoing claim 3 and in which said rollers are constituted in a plurality of groups thereof, the groups being adjustable in said radial directions, and mounting means therefor adjustable in directions longitudinally of the tubing.

5. Apparatus in accordance with the foregoing claim 2 and in which the anti-friction element or elements comprise plastic shoe means.

6. Apparatus for helically winding weldable strip material to form tubing and for welding the trailing edge of each convolution to the leading edge of the next to form a helical seam, said apparatus comprising in combination: an assembly of devices for forcefully advancing the strip longitudinally in flat condition in a predetermined direction at an angle to the axis of the desired tubing substantially equal to the pitch angle of the desired seam; a forming tool having interior surface portions conforming substantially to a semi-cylindrical surface coaxial with the axis of the tubing being formed; means for supporting said tool in a fixed position to extend longitudinally of the axis of the formed tubing, said assembly acting to push and guide said strip against surface portions within said forming tool, and circumferentially of said surface portions to form the convolutions, and whereby the trailing edges of the formed convolutions meet the incoming forward edge of the strip at a fixed weld point; means for heating said edges to welding temperature upon reaching said point; rollers mounted to engage at edges of the strip under pressure at the region of the weld point, such rollers being mounted respectively internally and externally of the tubing; mandrel-like means on which said internal roller is replaceably mounted; said mandrel-like means including a shaft carrying said internal roller and supported in an angularly adjustable eccentric collar whereby the position of the axis of the internal roller may be adjusted vertically by angular adjustments of said collar; and frame means for carrying said assembly of devices and also said mandrel-like means, and including supporting means therefor permitting same to be arcuately adjusted about a vertical axis extending through said weld point, thereby to adjust said angle for making tubing having helical seams with different pitch angles.

7. Apparatus for helically winding weldable strip material to form tubing and for welding the trailing edge portions of convolution to the leading edge of the next to form a helical seam, said apparatus comprising in combination: an assembly of devices for forcefully advancing the strip longitudinally in a predetermined direction at an angle to the axis of the desired tubing substantially equal to the pitch angle of the desired seam; a forming tool having interior surface portions conforming to a generally semi-cylindrical surface coaxial with the axis of the tubing being formed, means for supporting said tool in a fixed position to extend longitudinally of the axis of the formed tubing, said assembly being arranged and positioned for acting to push and guide said strip against the surface portions within said forming tool, and thence around circumferentially on said surface portions to form and advance the convolutions in a direction along the axis thereof, and whereby the trailing edge on the formed convolutions meets the incoming forward edge of the strip at a fixed weld point, said assembly of devices including strip driving means and strip guide means, said strip guide means being positioned intermediate said strip driving means and said forming tool, said strip guide means comprising upper and lower guide elements configured to span substantially the entire upper and lower lateral surfaces of said strip between said strip driving means and said forming tool thereby to prevent wrinkling of said strip, said upper and lower guide elements being extensible and retractable in the longitudinal direction without appreciable changes in the mutual spacing thereof; and means for heating said edges to welding temperature upon reaching said point.

8. Apparatus as in claim 7 wherein said guide elements are extensible and retractable by different amounts across their width.

9. Apparatus as in claim 7 wherein the guide elements on at least one side of said guide means comprises a plurality of guide bars arranged side by side and being extensible relative to each other.

10. Apparatus as in claim 9 wherein said guide bars are provided with a plurality of roller elements which press upon the surface of said strip.

References Cited

UNITED STATES PATENTS

| | | | |
|---|---|---|---|
| 1,583,212 | 5/1926 | Williams | 219—62 |
| 1,884,658 | 10/1932 | Gladkov et al. | 219—62 X |
| 2,501,845 | 3/1950 | Freeze | 219—62 |
| 3,004,135 | 10/1961 | Diener et al. | 219—62 |
| 3,024,348 | 3/1962 | Cavel | 219—62 |
| 3,046,382 | 7/1962 | Morris | 219—62 |
| 3,059,747 | 10/1962 | Sullivan | 193—35 |
| 3,106,177 | 10/1963 | Nicolaisen | 219—62 X |

RICHARD M. WOOD, *Primary Examiner.*

B. A. STEIN, *Assistant Examiner.*

UNITED STATES PATENT OFFICE
CERTIFICATE OF CORRECTION

Patent No. 3,383,488                  May 14, 1968

James Bandura et al.

It is certified that error appears in the above identified patent and that said Letters Patent are hereby corrected as shown below:

Column 10, line 14, "tube" should read -- tubing --; line 17, "circumferentailly" should read -- circumferentially --. Column 11, line 9, before "convolution" insert -- each --; line 17, "formed," should read -- formed; --. Column 12, line 4, "changes" should read -- change --.

Signed and sealed this 14th day of October 1969.

(SEAL)
Attest:

Edward M. Fletcher, Jr.                  WILLIAM E. SCHUYLER, JR.
Attesting Officer                         Commissioner of Patents